Figure 3:
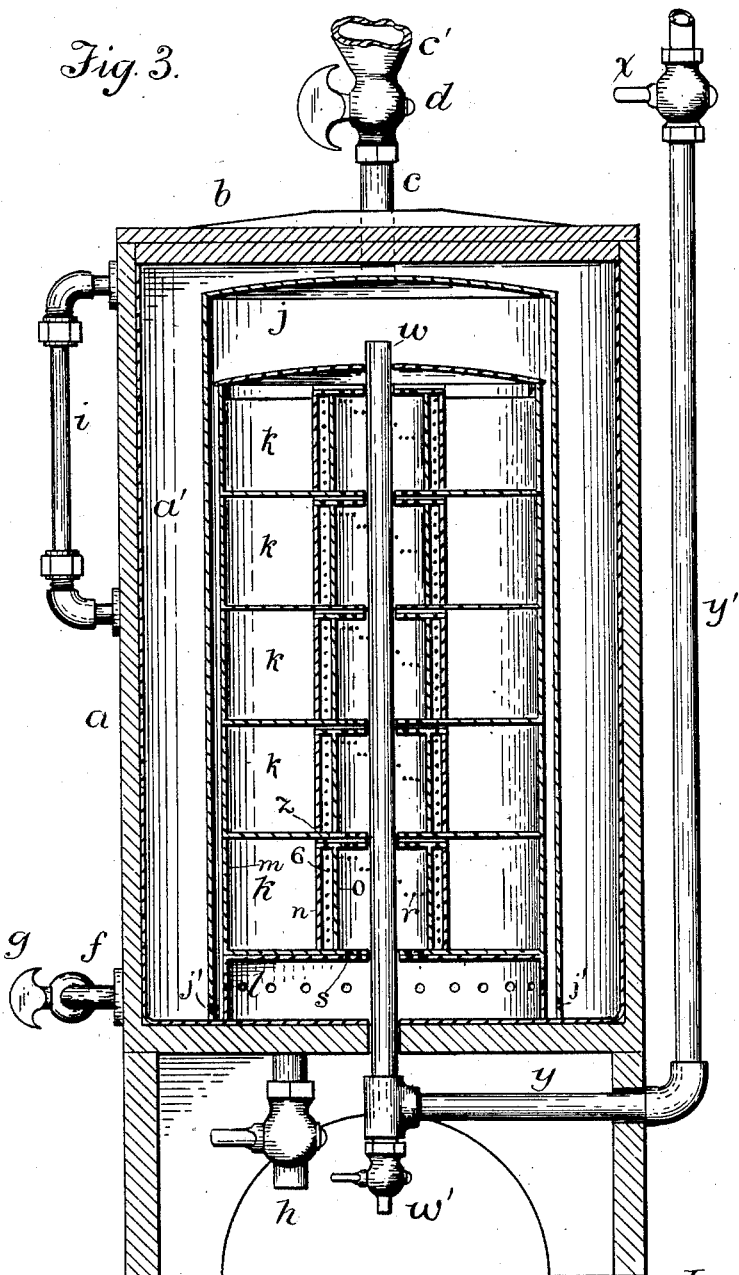

No. 737,747. PATENTED SEPT. 1, 1903.
J. KULJIS.
ACETYLENE GAS GENERATOR.
APPLICATION FILED NOV. 15, 1901.
NO MODEL. 3 SHEETS—SHEET 1.
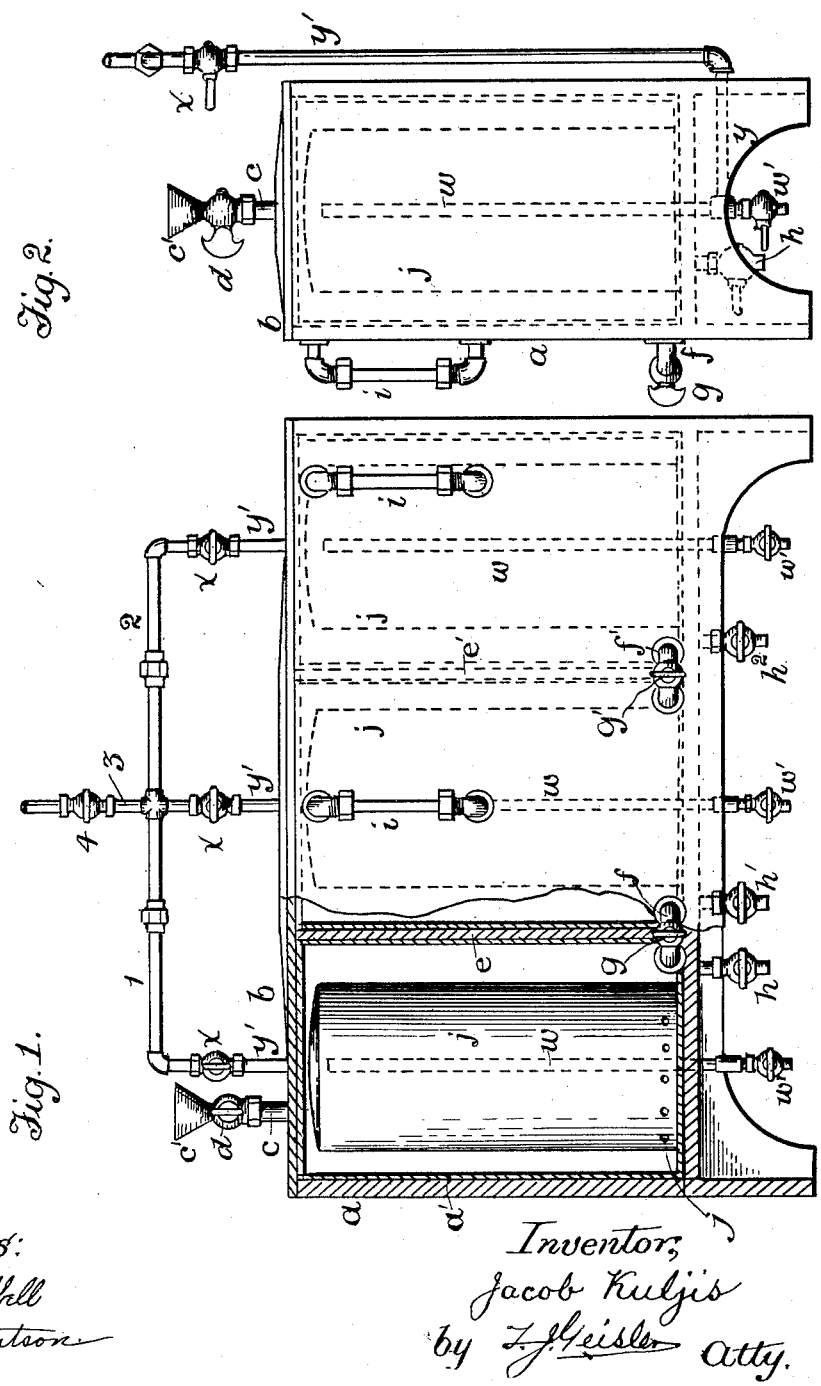
Witnesses:
L. H. Campbell
E. M. Howatson
Inventor;
Jacob Kuljis
by T. J. Geisler, Atty.

No. 737,747. PATENTED SEPT. 1, 1903.
J. KULJIS.
ACETYLENE GAS GENERATOR.
APPLICATION FILED NOV. 15, 1901.
NO MODEL. 3 SHEETS—SHEET 2.

Witnesses:
L. H. Campbell.
E. M. Howatson

Inventor,
Jacob Kuljis
by F. J. Geisler
Atty.

No. 737,747. PATENTED SEPT. 1, 1903.
J. KULJIS.
ACETYLENE GAS GENERATOR.
APPLICATION FILED NOV. 15, 1901.

NO MODEL. 3 SHEETS—SHEET 3.

Witnesses:
L. H. Campbell
E. M. Howatson

Inventor,
Jacob Kuljis
by J. Geisler
atty.

No. 737,747. Patented September 1, 1903.

UNITED STATES PATENT OFFICE.

JACOB KULJIS, OF PORTLAND, OREGON, ASSIGNOR TO ELECTRALENE MANUFACTURING COMPANY, OF PORTLAND, OREGON, A CORPORATION.

ACETYLENE-GAS GENERATOR.

SPECIFICATION forming part of Letters Patent No. 737,747, dated September 1, 1903.

Application filed November 15, 1901. Serial No. 82,452. (No model.)

*To all whom it may concern:*

Be it known that I, JACOB KULJIS, a subject of the Emperor of Austria-Hungary, and a resident of the city of Portland, in the county of Multnomah and State of Oregon, have invented a new and useful Improvement in Acetylene-Gas Machines, of which the following is a specification.

The object of my invention is to obtain an inexpensive and efficient acetylene-gas machine which may be charged with a sufficient quantity of calcium carbid so that the supply of gas will last for a considerable period of time, the carbid to be stored in small portions in separate cells, and such portions to be successively decomposed by the progressive admission of water, and to render the apparatus safe against an excessive generation of gas and the dangers resulting therefrom the admission of water to the carbid-cells is to be automatically controlled by the volume of gas consumed—that is to say, the water required for the decomposition of the carbid shall be fed to the carbid-cells by gravity and the head of water shall be balanced and restrained by the head or volume of generated gas contained in the generator. Thus the water is fed to a carbid-cell in small quantities at a time. As soon as the volume of gas contained in the generator overbalances the head of water the supply of the latter is cut off. As such volume diminishes the water takes its place and again enters the carbid-cells, causing a renewed generation of gas until the collected volume or head of gas again overbalances the head of water and drives it back, so that it no longer enters the carbid-cells, and the further generation of gas then ceases with the consumption of the small quantity of water which has previously been admitted into a carbid-cell.

To carry my object into effect and also obtain the novel features hereinafter specified, my machine is of the construction and arrangement illustrated in the accompanying drawings referred to as a part of this specification and in this specification described and claimed.

Figure 4:
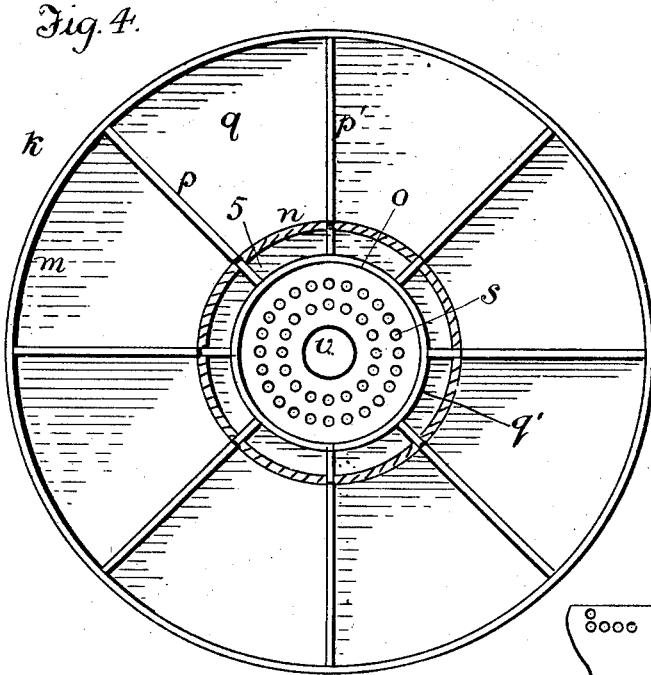
Figure 5:
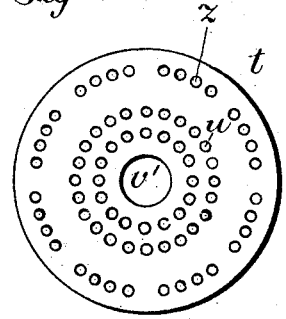
Figure 7:
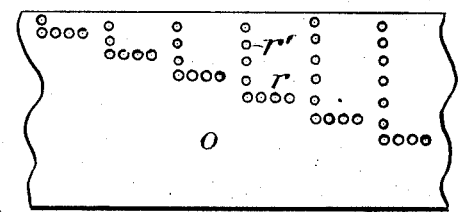
Figure 6:
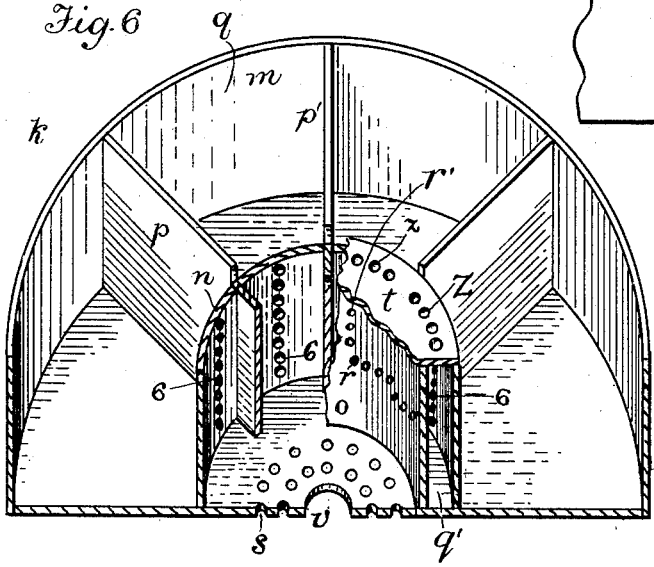

In the drawings, Figure 1 is a front elevation of my newly-invented acetylene-gas machine, partly in section. Fig. 2 is an end elevation of my machine. Fig. 3 is a vertical cross-section of the outer case or water-tank of my machine and of one of the generators therein contained and also shows a branch of the gas-supply or service pipe and other parts of the apparatus, as will be more fully explained. Fig. 4 is a plan of one of the carbid-pans, showing the construction thereof, the cover or top of the central compartment being removed. Fig. 5 shows the cover or top for said central compartment. Fig. 6 is a partial perspective elevation of one of the carbid-pans, showing the same as comprising a series of cells and having a central compartment or chamber through which the water enters the carbid-cells and through which also issues the generated gas; and Fig. 7 shows a portion of the strip of metal used for constructing the inner annular wall $o$, having perforations in steps through which the head of water is progressively admitted into the carbid-cells.

The letters and numerals designate the parts referred to throughout the several views.

The gas-generating apparatus is contained within an outer case or tank $a$, having a metallic lining $a'$ and cover $b$, the latter having air-holes to allow the air in the water-tank to escape while filling with water. The cover is provided with a water-inlet pipe $c$, having a hopper $c'$ and stop-cock $d$. The interior of the tank $a$ is divided into three compartments by means of two partition-walls $e$ $e'$, so as to be adapted to receive three generators so connected that they may be used in series or singly, as desired. The compartments are connected with each other at the bottom by means of pipes $f$ $f'$, respectively, provided with stop-cocks $g$ $g'$. The bottoms of each of said compartments of the tank $a$ are provided with drain-pipes $h$ $h'$ $h^2$, respectively, having stop-cocks. On the exterior of the said three compartments of the tank $a$ are provided water-gages $i$, so as to be informed of the level of the water contained in said tank. Within each of the three compartments is a gas-generator comprising a bell $j$, inclosing a series of pans $k$, set one upon the other, as shown in Fig. 3. The lower pan must be provided with a perforated rim-base *l*, suitably supported above the bottom of the tank *a*, so as to admit water through the perforations *s* in the bottom of the pan. The base of the bell is also provided with holes *j'* for the same purpose.

The construction of the pans *k* is illustrated in Figs. 4, 5, 6, and 7. Each of the same consists of an annular pan, the central portion of which is partitioned off by two concentric walls *n o*, and the space between the walls *m n* and *o n* is subdivided by partitions *p p'*, so as to provide a series of radially-disposed cells *q* and the wells *q'*. In constructing the pans *k* it is convenient to extend the partition-walls *p p'* from the wall *m* to the innermost wall *o* and to make the annular wall *n* of sections inserted between two radial partition-walls *p p'*—for example, as shown in Fig. 4. The outer annular wall *n* has a series of vertical holes 6, providing both an inlet for water and an outlet for the generated gas. The inner annular wall *o* is provided with a series of perforations *r r'*, arranged in rising steps progressing in higher levels. The vertical perforations *r'* are provided to allow the water to enter in greater volume into the carbid-cells supplied through a lower series of perforations *r* after the water has risen to such a level as to enter in the next upper series of such perforations *r*. The bottom of the pan within the wall *o* has perforations *s* to admit the water as it rises in the tank. To prevent carbid being accidentally inserted in the central compartment of a pan, the space interior of the annular wall *n* is covered by a top *t*, omitted from Fig. 4 and shown in the plan, Fig. 5, also shown in part in Fig. 6. Said top *t* has perforations *u*, corresponding with the perforations in the bottom. There are also holes *v v'* cut in the bottom and the top *t* of each pan through which to admit the gas-pipe *w*, having a drain-cock *w'* and branches *y y'*, controlled by a stop-cock *x*. The portion of the top *t* between the walls *n o* is further provided with perforations *z* to furnish an ample outlet for the gas issuing from the cells. The walls *n o* are of slightly lesser height than the main portion of a pan, so as to prevent the bottom of one pan covering the holes in the top of the pan below. The upwardly-extending branches *y'* of the respective gas-generators are connected by branches 1 and 2, which have a common outlet in the pipe 3, controlled by a valve or stop-cock 4, the pipe 3 being connected with the service-pipe.

The operation of my apparatus is as follows: The hopper *c'* may be of any convenient size and filled with water to replenish the water-tank as required. The admission of water through the tank into the bells is controlled by the stop-cock 4, for since the water-feed operates by gravity the head of water is balanced and restrained by the head of gas within the bells. The water may be confined to any of the compartments of the tank by shutting the stop-cocks *g g'*. The water-tank having been filled, and by adjusting the stop-cocks *x* of the respective branches *y'* of the generators, either one or all of said generators may be thrown into service or cut out. As soon as the stop-cock 4 is turned on the pressure of the water in the tank *a* will begin to displace the air within the bell of the generator and the water rising within such bell will be admitted through the perforations *s* in the bottom of the lowermost of the pans *k* and enter within the wall *o*. As the water now continues to rise a small quantity will be admitted through the lowest series of the perforations *r* of said wall *o*, and the water so admitted will enter one of the wells *q'* (see Fig. 4) inclosed by portions of the annular walls *n o* and partitions *p p'*. Thereupon the water will enter through the perforations 6 of the wall-section *n* into one of the cells *q* and acting upon the carbid stored in such cell start the generation of acetylene gas. When first starting the generation of gas, the air within the bell is allowed to be blown out in the usual manner. The jet on the service-pipe being now lighted, the volume of gas generated will be controlled in proportion to the volume of gas consumed, for as soon as the accumulated volume of the generated gas is substantially in excess of that consumed it will exert a back pressure upon the head of water in the water-tank *a* and lower the level of the water admitted within the bell and no more water will enter through the perforations *r* of the wall *o*. This condition will then continue until the volume of gas within the bell no longer exercises such back pressure. Then the water in the water-tank will again rise within the bell and the described operation will be repeated, starting the generation of gas anew in limited volume until the water has risen within the bell to such a level as to completely cover the lowest tank. The same action will then take place with respect to the next upper pan until the water covers all the pans and all the carbid has been decomposed. Thereupon the generators of the machine will have to be recharged. The means employed for regulating the quantity of water admitted into the carbid-cells and controlling the generation of gas are so sensitive in their operation that there is no danger of an excessive volume of gas being generated. The admission of the water through the stepped perforations *r* of the walls *o* of the pan is of minute quantity, and the instant that the gas begins to be evolved in any excessive volume the back pressure of the gas would immediately cut off the supply of water, while the small quantity of water which has been admitted into a cell would not be in excess of the quantity consumed for generating a volume of gas which the bell of a generator may safely contain. The generated gas collects in the head of the bell *j* and finds an outlet through the pipe *w* and branches *y y'* to the service-pipe.

By employing a series of generators the gas-delivery pipes of which have a common outlet controlled by a stop-cock, as illustrated in Fig. 1, an apparatus is obtained which may be so regulated as to supply the required volume of gas for a single burner or a number of burners. The force with which the gas is delivered into the service-pipe would be controlled by the stop-cock 4 and the automatic balance of the water-feed would regulate the generation of gas proportionately to the volume drawn from the generator, as above described. This feature renders my machine safe to operate, while it is also simple and inexpensive in construction.

Having fully described my invention, now what I claim, and desire to secure by Letters Patent, is—

1. A carbid-receptacle for gravity-feed acetylene-gas generators, consisting of a pan made with concentric inner walls $n$ $o$, and radial partitions, $p$ $p'$, providing a series of radially-disposed carbid-cells $q$, a central water-chamber, and intermediate wells $q'$; the portions of the wall $n$, between said radial partitions, having perforations the portions of the wall $o$, between said radial partitions having a series of perforations arranged in upwardly-progressing steps, and that portion of the bottom of the pan inclosed by the wall $o$ being also perforated; substantially as set forth.

2. A carbid-receptacle for gravity-feed acetylene-gas generators, consisting of a pan made with concentric inner walls $n$ $o$, and radial partitions, $p$ $p'$, providing a series of radially-disposed carbid-cells $q$, a central water-chamber and intermediate wells $q'$; the portions of the wall $o$, between said radial partitions having perforations vertically alined, and the portions of the wall $o$, between said radial partitions having a series of perforations arranged in upwardly-progressing steps, and that portion of the bottom of the pan inclosed by the wall $o$ being also perforated, and a cover inclosing the space interior of the wall, $n$, and provided with suitable perforations, substantially as set forth.

In testimony whereof I have hereunto affixed my signature, in the presence of two witnesses, this 23d day of October, 1901.

JACOB KULJIS.

Witnesses:
T. J. GEISLER,
GEO. GIUSTIN.